United States Patent
Kadry et al.

(10) Patent No.: US 12,175,398 B2
(45) Date of Patent: Dec. 24, 2024

(54) AUGMENTED REALITY (AR) SELF CHECKOUT ATTENDANT

(71) Applicant: NCR Voyix Corporation, Atlanta, GA (US)

(72) Inventors: Aleah Jean Kadry, Atlanta, GA (US); Gina Torcivia Bennett, Lawrenceville, GA (US); Jaier Gordon, Atlanta, GA (US); Yoshiki Kakehi, Atlanta, GA (US); Kelli Lee, Atlanta, GA (US); Timothy Edward Mason, Flowery Branch, GA (US); Kip Oliver Morgan, Atlanta, GA (US); Mike Zheng, Atlanta, GA (US)

(73) Assignee: NCR Voyix Corporation, Atlanta, GA (US)

(*) Notice: Subject to any disclaimer, the term of this patent is extended or adjusted under 35 U.S.C. 154(b) by 454 days.

(21) Appl. No.: 17/513,292

(22) Filed: Oct. 28, 2021

(65) Prior Publication Data

US 2023/0140194 A1    May 4, 2023

(51) Int. Cl.
*G06Q 20/18* (2012.01)
*G06F 3/01* (2006.01)
(Continued)

(52) U.S. Cl.
CPC ..... *G06Q 10/063114* (2013.01); *G06F 3/017* (2013.01); *G06F 9/541* (2013.01);
(Continued)

(58) Field of Classification Search
CPC ......... G06Q 10/063114; G06Q 50/265; G06Q 20/18; G06Q 20/206; G06Q 30/015;
(Continued)

(56) References Cited

U.S. PATENT DOCUMENTS

| | | | |
|---|---|---|---|
| 2005/0080693 A1* | 4/2005 | Foss, Jr. | G07G 1/0018 705/16 |
| 2014/0210621 A1* | 7/2014 | Argue | G08B 13/19682 340/568.1 |

(Continued)

OTHER PUBLICATIONS

Puspitasari et al, AR-Mart: The Implementation of AR as a Smart Self-Service Cashier in the Pandemic Era, 2021 International Conference on Computer Science and Artificial Intelligence, pp. 1-6. (Year: 2021).*

*Primary Examiner* — Aaron W Carter
*Assistant Examiner* — Kathleen M Broughton
(74) *Attorney, Agent, or Firm* — Schwegman Lundberg & Woessner, P.A.

(57) ABSTRACT

Objects associated with a self-checkout area are identified and tracked through transaction data comprised of transaction details, device statuses, transaction interrupts/events, and video feeds during transactions on Self-Service Terminals (SSTs). Selective objects and selective transaction data are correlated together in a group for each transaction. Actions required of an attendant who is managing the transactions are identified for each group. An Augmented Reality (AR) interface is provided on an attendant-operated device that visually and uniquely identifies the actions, each group requiring a given action, and each object of each group that is to be the subject of the given action. In an embodiment, remote verification, audit, and override actions are processed through gestures made by the attendant and detected by the AR interface.

20 Claims, 3 Drawing Sheets

(51) Int. Cl.

| | | |
|---|---|---|
| *G06F 9/54* | (2006.01) | |
| *G06Q 10/0631* | (2023.01) | |
| *G06Q 50/26* | (2012.01) | |
| *G06T 7/20* | (2017.01) | |
| *G06T 11/60* | (2006.01) | |
| *G06V 20/40* | (2022.01) | |
| *G06V 20/50* | (2022.01) | |
| *G06V 20/52* | (2022.01) | |
| *G06V 40/20* | (2022.01) | |
| *H04N 23/66* | (2023.01) | |

(52) U.S. Cl.
CPC ............. *G06Q 50/265* (2013.01); *G06T 7/20* (2013.01); *G06T 11/60* (2013.01); *G06V 20/41* (2022.01); *G06V 20/50* (2022.01); *G06V 20/52* (2022.01); *G06V 40/28* (2022.01); *H04N 23/66* (2023.01); *G06Q 20/18* (2013.01); *G06T 2207/10016* (2013.01); *G06T 2207/30196* (2013.01); *G06T 2207/30232* (2013.01); *G06V 20/44* (2022.01)

(58) Field of Classification Search
CPC .... G06Q 30/06; G06Q 30/0643; G06F 3/017; G06F 3/011; G06F 3/012; G06F 3/013; G06F 9/541; G06T 7/20; G06T 11/60; G06T 2207/10016; G06T 2207/30196; G06T 2207/30232; G06V 20/41; G06V 20/50; G06V 20/52; G06V 20/44; G06V 40/28; H04N 23/66; G07G 1/0054; G07G 1/0009; G07F 19/207

See application file for complete search history.

(56) References Cited

U.S. PATENT DOCUMENTS

| | | | |
|---|---|---|---|
| 2014/0240349 A1* | 8/2014 | Tuukkanen | G06F 3/0484 345/633 |
| 2015/0213544 A1* | 7/2015 | Herwig | H04W 4/024 705/26.9 |
| 2017/0039613 A1* | 2/2017 | Kaehler | G02B 27/0172 |
| 2017/0249754 A1* | 8/2017 | Fein | G06F 3/011 |
| 2018/0101810 A1* | 4/2018 | Feng | G06Q 10/1097 |
| 2018/0232796 A1* | 8/2018 | Glaser | G06Q 90/20 |
| 2020/0286058 A1* | 9/2020 | Edwards | G06V 20/52 |
| 2021/0201029 A1* | 7/2021 | Ju | G06Q 30/0185 |
| 2021/0201030 A1* | 7/2021 | Ju | G06V 20/20 |
| 2023/0130735 A1* | 4/2023 | Perrucci | G06V 20/52 382/103 |
| 2023/0137484 A1* | 5/2023 | Morgan | G06T 13/20 345/633 |

* cited by examiner

AUGMENTED REALITY (AR) SELF CHECKOUT ATTENDANT

BACKGROUND

Self-Service (SS) transactions via Self-Service Terminals (SSTs) or Self-Checkouts (SCOs) are increasingly being deployed with greater frequency in retail stores. One reason for this deployment bonanza is because customers are becoming more accustomed to SS transactions via SCOs, but another reason is because retail stores are significantly under staffed and the pandemic exacerbated this issue for retailers.

With SS transactions, the retailer utilizes a management terminal operated by an attendant to monitor the SS transactions for purposes of customer assistance and fraud detection. Fraud remains a significant concern for the retailers during SS transactions.

Typically, a single attendant is responsible for monitoring multiple SCOs. At any given moment in time an attendant can be responsible for monitoring several concurrent transactions from the management terminal, visually inspecting the SCO areas where the the customers are checking out, and potentially and simultaneously responding to a customer that has a question of the attendant. In this chaotic environment, the attendant needs to know where to optimally place their focus in order to ensure that any customer in need of assistance is not waiting too long for assistance and in order to ensure that the retailer does not experience any loss through customer theft.

A customer that waits too long may provide negative social media reviews for the retailer and may not return to the retail store with future business. Moreover, lines form behind the customer waiting on assistance for access to the customer's SST, such that the displeasure of one customer can quickly become retailer dissatisfaction of many customers who are also waiting to checkout of the store.

Unfortunately, attendants are human and a prone to making decisions that are less than optimal largely because the attendants lack the ability to quickly evaluate all the available information for all the concurrent checkouts and and to calculate in real-time risks associated with a chaotic checkout environment in order to focus their attentions on the most pressing situations.

SUMMARY

In various embodiments, a system and methods for an Augmented Reality (AR)-based self checkout attendant management service are provided.

According to an embodiment, a method for providing an AR-based self checkout attendant management service is presented. Transaction data and video data are collected for a transaction being processed at a Self-Service Terminals (SST) within a transaction area of the SST. Objects are tracked from the video data as a customer, a cart, the SST, at least one item, and zero or more bags. At least one intervention is identified that is required of an attendant for a particular object based on a particular event associated with one or more of the transaction data and the video data. A distinctive visual feature for the particular object or a message for the particular event is rendered within an Augmented Reality (AR) interface being viewed and operated by the attendant based on the intervention identified.

DETAILED DESCRIPTION

Figure 1:
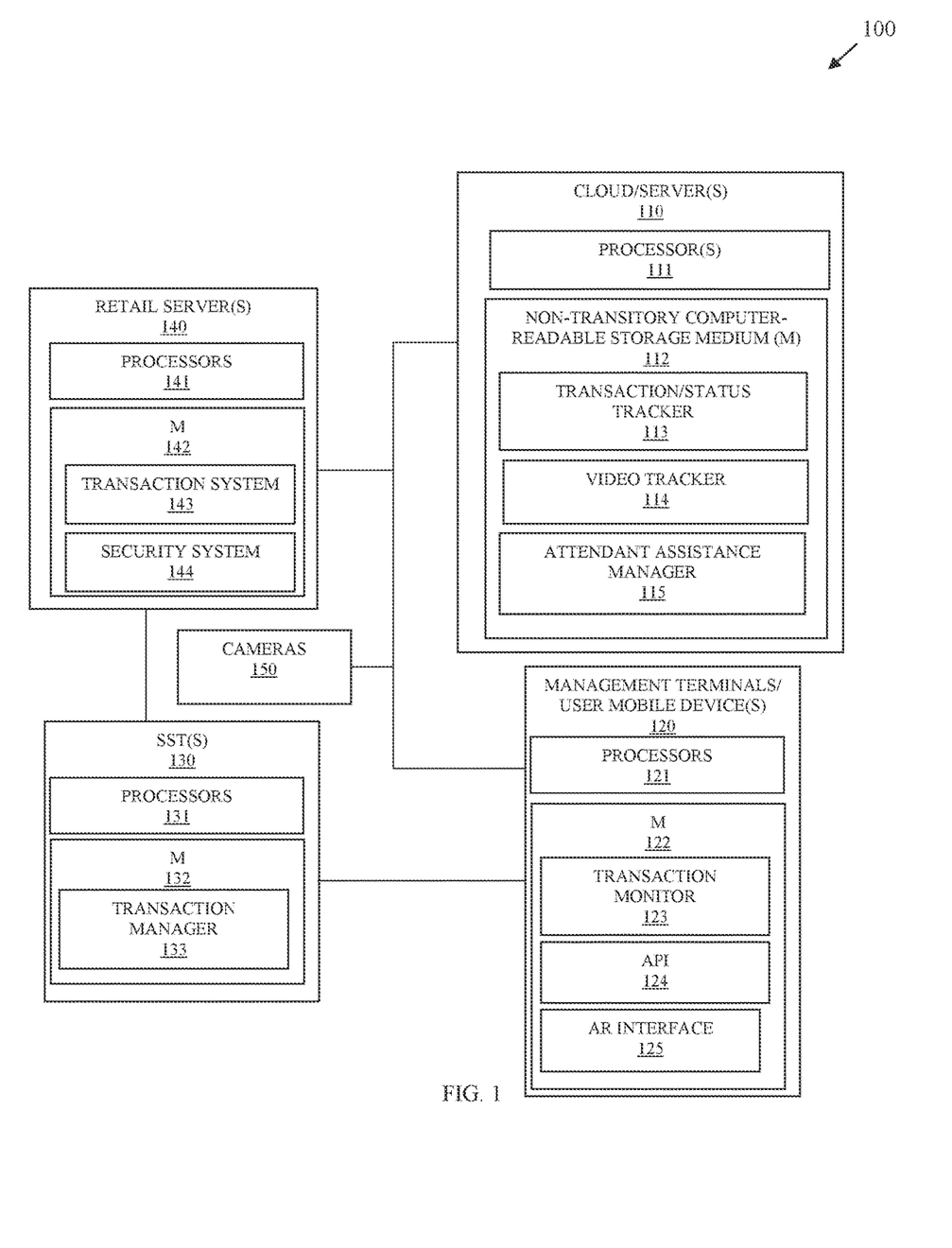
FIG. 1 is a diagram of a system for providing an AR-based self checkout attendant management service, according to an example embodiment.

FIG. 1 is a diagram of a system/platform 100 for providing an AR-based self checkout attendant management service, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of providing an AR-based self checkout attendant management service, presented herein and below.

System/platform 100 (herein after just "system 100") provides a processing environment by which customers, transaction devices, carts, and items are monitored in real time within transaction areas associated with a plurality of Self-Service Terminals (SSTs) during self-checkouts by the customers while being monitored by an attendant who is responsible for overseeing the self-checkouts of the SSTs.

A variety of data is collected from the SSTs, the transactions, and video feeds of the transaction areas. Objects representing the customers, the transaction devices (including SSTs), carts of the customers, and items in possession of the customers or in the carts are identified and tracked from the video feeds. Movements and activity of the objects are tracked and identified via unique activity identifiers from the video feeds. The data collected from the SSTs and the transactions are grouped and correlated together for each transaction as a group of selective objects. When an action is required of the attendant for a given group, the type of action and the action itself are identified.

Visual information that identifies the group, the action type, the action, and one or more specific objects that are the subject of the action are rendered within an AR interface on an attendant-operated device for performance by the attendant.

In some instances, the attendant can perform the identified action remotely though speech or a gesture identified by the AR interface through a microphone of the attendant-operated device and/or through a camera of the attendant-operated device.

In some instances, actions requiring verification by the attendant can be performed by the attendant with additional information supplied by a given customer or attested to by the attendant through the AR interface.

As used herein, the terms "customer" and/or "consumer," may be used interchangeably and synonymously herein and below. This refers to an individual who is engaged in a Self-Service (SS) transaction at an SST.

As used herein, the terms "attendant" and/or a "clerk" may be used interchangeably and synonymously herein and below. This refers to an individual who is operating a management terminal or a mobile management device as oversight of the SS transactions being processed at the SSTs. This may also refer to any employee or agent of a retail store that is tasked with monitoring the transaction areas associated with the SSTs.

As used herein, "transaction data" comprises transaction details for the SS transaction, device statuses of the SSTs or peripherals of the SSTs, transaction interrupts, security events, and video feeds captured of the transaction areas during the SS transactions at the SSTs.

System 100 comprises a cloud/server 110, one or more management terminals/mobile devices 120, a plurality of SSTs 130, one or more retail servers 140, and one or more overhead cameras 150 situated above the SSTs 130 and capturing video of the SST transaction areas during the SS transactions.

Cloud/Server 110 comprises at least one processor 111 and a non-transitory computer-readable storage medium 112. Medium 112 comprises executable instructions for a transaction/status tracker 113, video tracker 114, and attendant assistance manager 115. The executable instructions when provided to and executed by processor 111 from medium 112 cause processor 111 to perform the processing discussed herein and below for transaction/status tracker 113, video tracker 114, and attendant assistance manager 115.

Each management terminal/mobile device 120 (hereinafter just "management terminal 120") comprises at least one processor 121 and a non-transitory computer-readable storage medium 122. Medium 122 comprises executable instructions for transaction monitor 123, an Application Programming Interface (API) 123, and an AR interface 125. The executable instructions when provided to and executed by processor 121 from medium 122 cause processor 121 to perform the processing discussed herein and below for transaction monitor 123, API 124, and AR interface 125.

Each SST 130 comprises at least one processor 131 and a non-transitory computer-readable storage medium 132. Medium 132 comprises executable instructions for a transaction manager 133. The executable instructions when provided to and executed by processor 131 from medium 132 cause processor 131 to perform the processing discussed herein and below for transaction manager 133.

Each retail server 140 comprises at least one processor 141 and a non-transitory computer-readable storage medium 142. Medium 142 comprises executable instructions for a transaction system 143 and security system 144. The executable instructions when provided to and executed by processor 141 from medium 142 cause processor 141 to perform the processing discussed herein and below for transaction system 143 and security system 144.

Cameras 150 are dispersed through a retail store located in a variety of locations. Some of the cameras 150 can be three-dimensional (3D) cameras, Lidar-capable cameras, or two-dimensional (2D) stereo vision cameras. Some cameras 150 may be integrated peripheral devices of the SSTs 130 or cameras associated with integrated item barcode scanners of the SSTs 130. Each camera comprises an identifier that is mapped to a specific physical location within the store and mapped to a specific field of view or area that images at the specific location are associated with, Cameras 150 streams image frames of video into a network accessible storage location and/or in-memory storage buffer which is accessible to cloud/server 110 along with metadata associated with each image frame, such as time and date stamp, camera identifier, field-of-view or area identifiers, etc.

It is to be noted for the discussion and examples that follow that a single attendant may operate more than 1 management terminal 120 while monitoring the transaction areas of SSTs 130. For example, the attendant may be monitoring the transactions of the transaction areas via a terminal 120 while simultaneously operating a user mobile device 120. The mobile device 120 may be AR-enabled glasses 120 or an AR headset or the mobile device 120 may be a tablet 120, a phone 120, or a watch 120. In some cases, the attendant may operate a standalone terminal 120 while wearing AR-enabled glasses 120 and while simultaneously operating a phone 120 (three devices 120). Each of the various types of devices may comprises monitor 123, API 124, and AR interface 125, In some instances, any mobile device 120 worn and/or operated by the attendant may comprise just AR interface 125 or just API 124 and AR interface 125.

It is within this context that FIG. 1 of system 100 is now discussed.

Transaction data (transaction details for the SS transactions, device statuses of the SSTs 130 or peripherals of the SSTs, transaction interrupts, security events, and video feeds captured of the transaction areas during the SS transactions at the SSTs 130) is captured or collected by attendant assistance manager 115 for real-time evaluation.

Transaction/status tracker 113 reports the transaction details to attendant assistance manager 115 in real time as the corresponding transaction manager 133 processes each SS transaction. Transaction details comprise a transaction identifier for a given transaction, an SST identifier associated with the transaction identifier on a given SST 130, time of day that the given transaction was started by the corresponding transaction manager 133, calendar date of the given transaction, any customer identifier for a customer (if available for the given transaction), item identifiers for items already scanned or entered during the customer transaction at a corresponding SST 130 and recorded by the corresponding transaction manager 133, item details, item quantities, and item pricing for the items.

Transaction/status tracker 113 also provides any interrupts generated by the corresponding transaction manager 133, transaction system 143, and/or security system 144 during any given transaction to attendant assistance manager 115. Interrupts may comprise an event (security or non-security event) associated with an event type and any available event information associated with the event.

An event type comprises events for age verification for purchase of a restricted item (such as alcohol or tobacco), quantity of a particular item exceeding what is permitted (this can be related to a type of drug being purchased or any item whose quantity is being restricted (perhaps due to supply shortages or demand for the item), the value of an item exceeding a predefined threshold (a high-value item), a randomly generated or security generated audit on the transaction, m is-scanning of an item, weight mismatch for an item that was weighed, security to check that a container being purchased is actually empty (such as a cooler), device status indicating a SST 130 is out of media (such a receipt paper, ink, etc.) or indicating the SST has a receipt printer jam (or any other device status type of event), security indicating an item was never scanned that remains in a cart of the customer when a payment was initiated by the corresponding transaction manager 133, and other types of events.

Video tracker 114 uniquely identifies each object (customer, SST 130, cart, item, bags) from the video feeds of cameras 150. The metadata associated with the video feeds allow video tracker 114 to determine a location of each object relative to remaining objects within the transaction areas. Features associated with each object type (customer, SST 130, cart, item, bags) are used to quickly identify each object and object time from image frames of the video feeds. Each object's relationship is determined by video tracker 114 based on that object's distance or location relative to remaining objects available in a given image frame. The object's relationship is carried as metadata with each object. Some relationships may include a given item is in a given cart, a given item is on a counter of the SST 130, a given item is in a hand of a given customer, a given item is associated with a given bag, a given item is on a weigh scale of a given SST 130, a given cart exceeds a threshold number of items indicating that the cart is full, etc. The relationship may also include movement metadata, such as a given item was moved to a bottom of a cart by a customer, a given item was placed in a purse or within clothing of a customer, a customer is moving away from a given SST 130, a customer is detected as turning away from the given SST 130 for several elapsed image frames that exceeds a given amount of time, a customer is exhibiting a behavior or facial feature indicating help or assistance is needed (based on predefined behaviors or facial features), the customer made a gesture indicating help is needed based on the predefined behaviors), etc. Any behavior or gesture made by a customer is identified by video tracker 114 via a unique behavior or facial feature identifier and carried with the customers object.

Attendant assistance manager 115 receives the transaction data from transaction/status tracker 113 and video tracker 114 and correlates the objects, transaction details, device status, and events into a single group for each ongoing SST transaction. A single group object comprises one SST object for a single SST 130. A single croup object may comprise at least one customer object but may also include multiple customer objects. A single group object may include, no cart objects, one cart object, or multiple cart objects. A single group object may include a single item object or multiple item objects. A single group object may include a single bag object, multiple bag objects, or no bag objects.

Each group object's transaction data is tracked for events or interrupts raised by corresponding transaction manager 133, transaction system 143, and/or security system 144. Rules are evaluated to determine when an intervention is needed by the attendant for any given group object and its corresponding transaction. In some cases, interventions are raised independently of evaluation of the rules by transaction monitor 123 and when this occurs the intervention is communicated to attendant assistance manager 115 through API 124. Each intervention is associated with one or more actions required of the attendant (the one or more actions may also be defined in the rules). Unique visual features or visual effects are assigned to each intervention type and/or actions required by the attendant.

An intervention is an action taken by the attendant, and action can be paying attention or watching a transaction remotely from the management terminal 120; visiting a given SST 130 to perform a price or item verification, an override, a void, a price override, request a price check, perform a transaction audit; and/or can be remotely (while the attendant remains at the management terminal 120) performing an override, a void, a price override, a request a price check, etc.

AR interface 125 provides an attendant live field-of-view video of the transaction areas comprising the groups and the objects of each group. The attendant views the transaction areas within the AR interface 125 and overlaid on top of any object requiring an intervention is its unique visual feature assigned by attendant assistance manager 115. Attendant assistance manager 115 provides the locations of each object along with the visual features or effects to AR interface 125 and AR interface 125 overlays the visual features or effects onto the corresponding object(s) within the live field-of-view video being watched by the attendant. Optionally, a specific message for an action item is also displayed in a corner of the display that informs the attendant that a specific SST 130 requires a specific intervention.

For example, when the mobile device 120 is AR-enabled glasses 120, when the attendant looks at the transaction areas a message is displayed in a corner of one or more of the lenses of the glasses 120 that indicates lane 8 requires date of birth or age verification, lane 6 has an item weight mismatch, lane 3 has a full cart of items, lane 2 has a non-scanned item when payment was initiated that remains in the cart, lane 2 customer needs assistance, lane 5 includes a high-value item, lane 9 (SST 9 130) has a receipt paper jam, etc. The specific objects associated with each intervention can be colored or highlighted (visual feature) within the field-of-view to pinpoint its location and SST 130 for the attendant without obstructing other objects within the field-of-view of AR-enabled glasses 120.

AR interface 125 may also be operated through voice or through gestures for the attendant to clear or override some of the interrupts or to perform some of the required attendant actions for a given interrupt. For example, for age verification the attendant can place a government issued identification card in the field of view of the AR-enabled glasses 120 and blink to snap an image, then blink to capture the face of the customer; API 124 is activated to perform Optical Character Recognition (OCR) on the date of birth on the card image and perform facial comparison analysis on the customer facial image and the image on the card. When verified, API 124 records the necessary verification information for the attendant for auditing and performs the operation with monitor 123 to clear the age verification.

In another case, a container that needs to be checked to ensure it is empty based on a security event raised can allow the attendant to open the container and look inside the container with glasses 120 and blink to take an image. An image is taken and confirms the container is empty, any manual entry required of the attendant through monitor 123 is performed by API 124 once the image taken by the glasses 120 is confirmed to be devoid of any other items. An item present in the container may further cause API 124 to perform a machine-learning item recognition process to identify the item and report to the attendant.

Other types of interrupts such as item weight mismatch, high-value item, and item quantity restrictions can be cleared without the attendant visiting the corresponding SST 130 by using a gesture (thumbs up, thumbs down, waving) in front of the glasses 120 field of view once the attendant visual verifies from the attendant remote location or through transaction details reported to assistance manager 115.

Item void interrupts require the attendant to collect the item that was voided by a customer from the corresponding lane or SST 130. Here, the attendant can simply use the glasses take the item within the field of view and API 124 dears the interrupt from the transaction.

Double scans can be fixed by the attendant using the glasses 120 to view an item count on the receipt and view the item count with the cart or bags and initiating a thumbs up to clear the errant scan from the transaction.

The glasses 120 may also be equipped with a microphone such that overrides and actions can be performed by the attendant through speech commands while wearing the glasses 120, such as clear the item weight mismatch on lane 2, clear the high-value item on lane 3 as the transaction details indicate it was scanned and recorded for the transaction, etc.

API 124 permits the actions and verifications needed by an attendant for a given interrupt to be performed through the attendant's gesture-based actions in front of an integrated camera (facing inward at the eyes of the attendant or outward toward the transaction areas or both inward and outward) of an AR-enabled device 120 or through speech detected by a microphone of the AR-enabled device 120. API 124 can translate the gestures and voice with the necessary captured audit data (images when needed) and process with monitor 123 on behalf of the attendant.

A variety of machine-learning algorithms or Artificial Intelligence (AI) algorithms can be integrated with API 124 for purposes of item recognition, item quantity recognition, facial recognition and verification, etc. Such that monitor 123 can be assured that the proper verifications were made by the attendant as reported by API 124 without the attendant having to access a user-facing interface of monitor 123 and providing audit information for the verification.

In fact, a variety of situations and additional attendant workflows that require an attendant to intervene and perform one or more actions can be completely automated using system 100 (all such situations and workflows are intended to fall within embodiments of the teachings presented herein). This permits a single attendant to manage a busy pool of SSTs 130 simultaneously and with an efficiency and a quality that have heretofore been incapable in the industry. This is particularly important in view of current labor shortages and the increased overall usage of SSTs 130 by customers in the industry.

Figure 2:
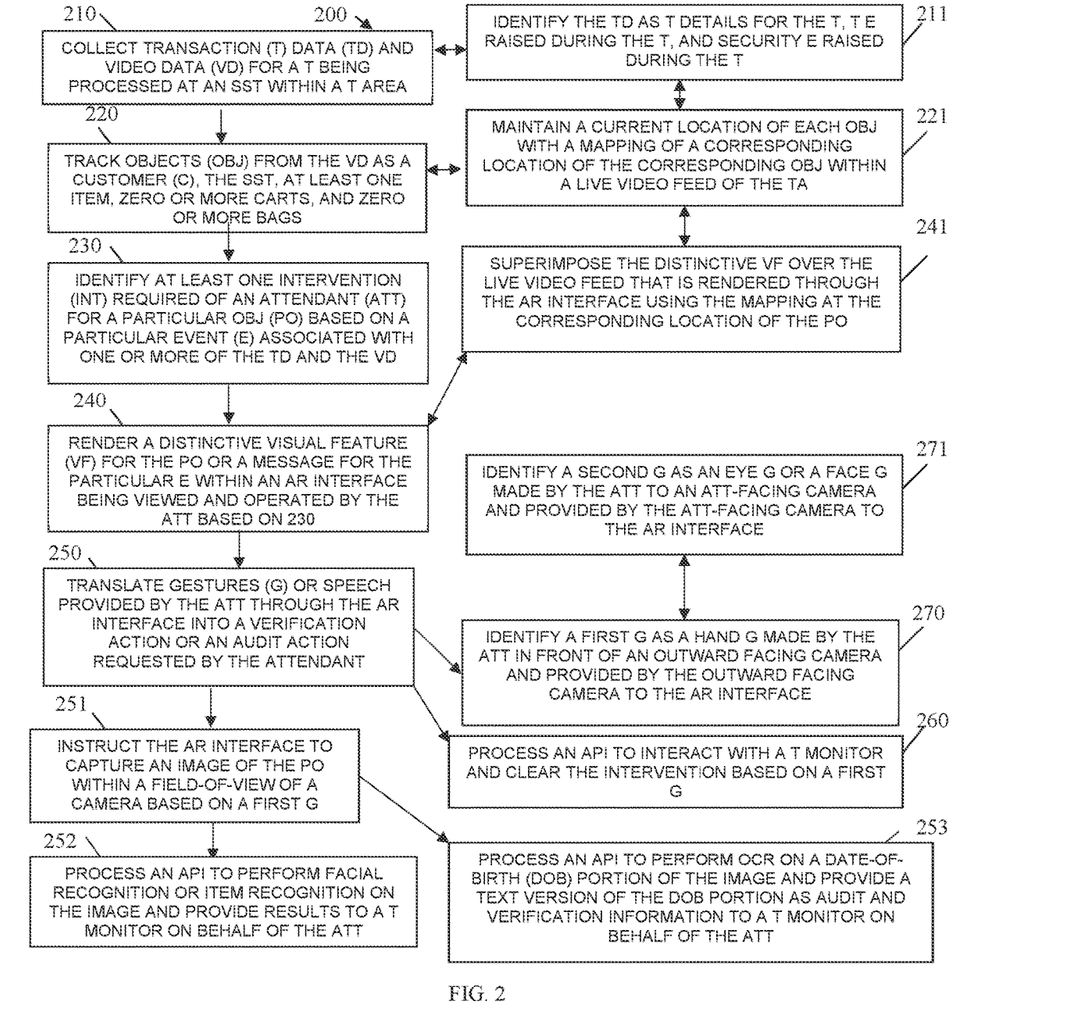
FIG. 2 is a diagram of a method for providing an AR-based self checkout attendant management service, according to an example embodiment.
Figure 3:
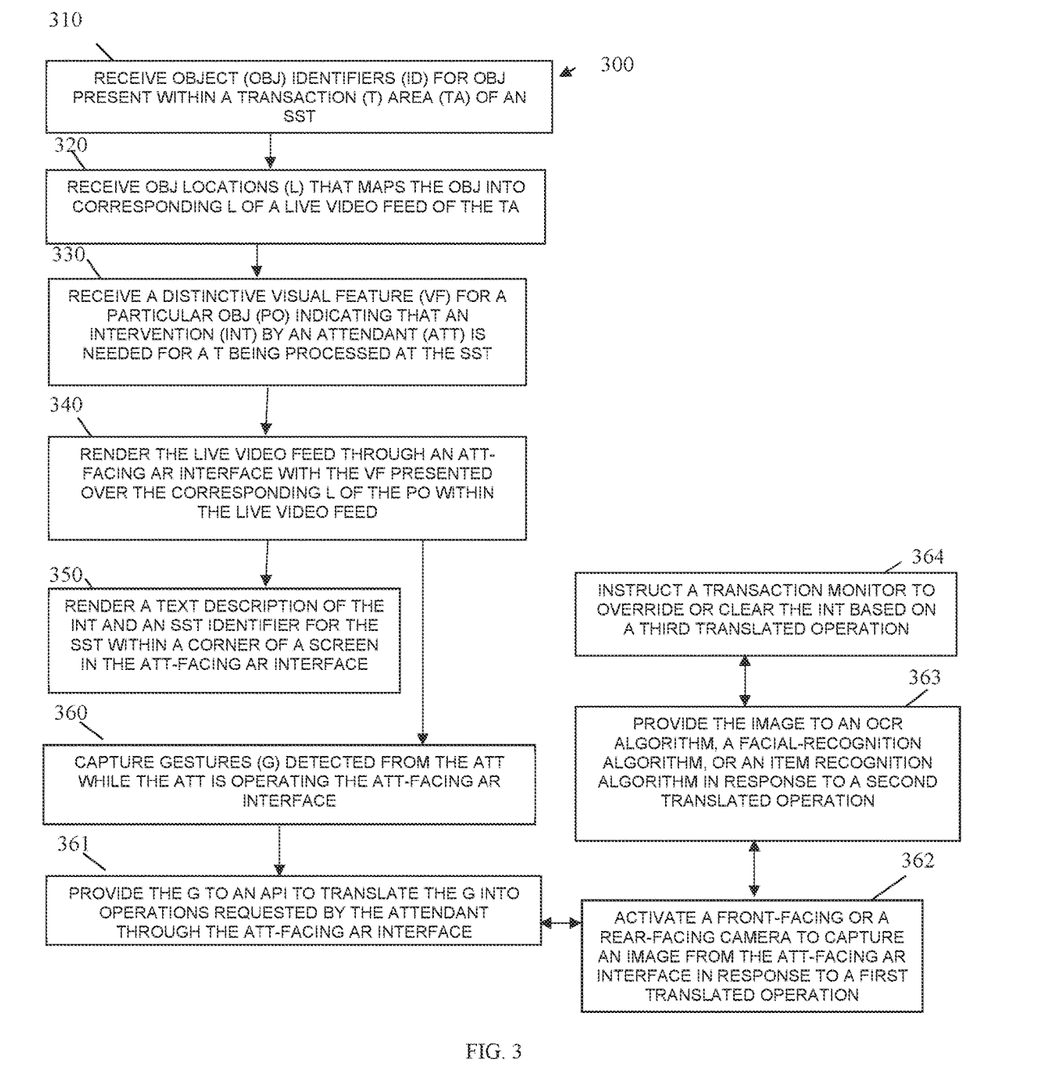
FIG. 3 is a diagram of another method for providing an AR-based self checkout attendant management service, according to an example embodiment.

The above-referenced embodiments and other embodiments are now discussed within FIGS. 2-3.

FIG. 2 is a diagram of a method 200 for providing an AR-based self checkout attendant management service, according to an example embodiment. The software module(s) that implements the method 200 is referred to as an "AR-based self checkout attendant." The AR-based self checkout attendant is implemented as executable instructions programmed and residing within memory and/or a non-transitory computer-readable (processor-readable) storage medium and executed by one or more processors of one or more devices. The processor(s) of the device that executes the AR-based self checkout attendant are specifically configured and programmed to process the AR-based self checkout attendant. The AR-based self checkout attendant may have access to one or more network connections during its processing. The network connections can be wired, wireless, or a combination of wired and wireless.

In an embodiment, the device that executes the AR-based self checkout attendant is cloud 110. Cloud 110 comprises a plurality of servers logically cooperating and accessible as a single server 110 (cloud 110).

In an embodiment, the device that executes the AR-based self checkout attendant is a server 110 that is separate from any given retail server 140.

In an embodiment, the device that executes the AR-based self checkout attendant is retail server 140.

In an embodiment, the AR-based self checkout attendant is all or some combination of 113, 114, and/or 115.

At 210, the AR-based self checkout attendant collects transaction data and video data for a transaction being processed at an SST 130 within a transaction area proximate to the SST 130.

In an embodiment, at 211, the AR-based self checkout attendant identifies the transaction data as transaction details for the transaction, transaction events raised during the transaction (by transaction manager 133 or transaction system 143), and security events raised during the transaction (by security system 144).

At 220, the AR-based self checkout attendant tracks objects from the video data as a customer, the SST 130, at least one item, zero or more carts, and zero or more bags.

In an embodiment of 211 and 220, at 221, the AR-based self checkout attendant maintains a current location of each object with a mapping of a corresponding physical location of the corresponding object within a live video feed of the transaction area.

At 230, the AR-based self checkout attendant identifies at least one intervention required of an attendant for a particular object based on a particular event associated with one or more of the transaction data and the video data.

At 240, the AR-based self checkout attendant renders a distinctive visual feature for the particular object or a message for the particular event within an AR interface 125 being viewed and operated by the attendant based on 230.

In an embodiment of 221 and 240, at 241, the AR-based self checkout attendant superimposes the distinctive visual feature over the live video feed that is rendered through the AR interface 125 using the mapping at the corresponding location of the particular object.

In an embodiment, at 250, the AR-based self checkout attendant translates gestures or speech provided by the attendant as input to the AR interface 125 into a verification action or an audit action that is being requested by the attendant while operating the AR interface 125.

In an embodiment of 250 and at 251, the AR-based self checkout attendant instructs the AR interface 125 to capture an image of the particular object within a field-of-view of a camera based on a first gesture.

In an embodiment of 251 and at 252, the AR-based self checkout attendant processes an API 124 to perform facial recognition or item recognition on the image and provide results to a transaction monitor 123 on behalf of the attendant.

In an embodiment of 251 and at 253, the AR-based self checkout attendant processes an API 124 to perform OCR on a date-of-birth (DOB) portion of the image and provide a text version of the DOB portion as audit and verification information to a transaction monitor 123 on behalf of the attendant.

In an embodiment of 250 and at 260, the AR-based self checkout attendant processes an API 124 to interact with a transaction monitor 123 and clear the intervention based on a first gesture.

In an embodiment of 250 and at 270, the AR-based self checkout attendant identifies a first gesture as a hand gesture made by the attendant in front of an outward or forward-facing camera and provided by the outward or forward-facing camera to the AR interface 125.

In an embodiment of 270 and at 271, the AR-based self checkout attendant identifies a second gesture as an eye gesture, or a facial gesture made by the attendant to an attendant-facing camera and provided by the attendant-facing camera to the AR interface 125.

FIG. 3 is a diagram of another method 300 for providing an AR-based self checkout attendant management service, according to an example embodiment. The software module(s) that implements the method 300 is referred to as an "AR checkout monitor." The AR checkout monitor is implemented as executable instructions programmed and residing within memory and/or a non-transitory computer-readable (processor-readable) storage medium and executed by one or more processors of a device. The processors that execute the AR checkout monitor are specifically configured and programmed for processing the AR checkout monitor. The AR checkout monitor may have access to one or more network connections during its processing. The network connections can be wired, wireless, or a combination of wired and wireless.

In an embodiment, the device that executes the AR checkout monitor is device 120. In an embodiment, device 120 is a management terminal. In an embodiment, device 120 is an AR-enabled mobile device, such as a phone, a tablet, glasses, a watch, or a laptop.

In an embodiment, the AR checkout monitor is all of or some combination of 123, 124, and 125.

The AR checkout monitor interacts with cloud/server 110 as discussed with system 100 and as discussed with method 200 discussed above with FIGS. 1 and 2, respectively.

At 310, the AR checkout monitor receives object identifiers for objects presenting within a transaction area of an SST 130.

At 320, the AR checkout monitor receives object locations that maps the objects into corresponding location of a live video feed of the transaction area.

At 330, the AR checkout monitor receives a distinctive visual feature for a particular object indicating that an intervention by an attendant is needed for a transaction being processed at the SST 130.

At 340, the AR checkout monitor renders the live video feed through an attendant-facing interface with the distinctive visual features presented over the corresponding location of the particular object within the live video feed.

In an embodiment, at 350, the AR checkout monitor renders a text description of the intervention and an SST identifier for the SST 130 within a corner of a screen in the attendant-facing interface.

In an embodiment, at 360, the AR checkout monitor captures gestures detected from the attendant while the attendant is operating the attendant-facing interface.

In an embodiment of 360 and at 361, the AR checkout monitor provides the gestures to an API 124 to translate the gestures into input operations requested by the attendant through the attendant-facing interface.

In an embodiment of 361 and at 362, the AR checkout monitor activates a front-facing or a rear-facing camera to capture an image from the attendant-facing interface in response to a first translated operation.

In an embodiment of 362 and at 363, the AR checkout monitor provides the image to an OCR algorithm, a facial-recognition algorithm, or an item recognition algorithm in response to a second translated operation.

In an embodiment of 363 and at 364, the AR checkout monitor instructs a transaction monitor 123 to override or clear the intervention based on a third translated operation.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    collecting transaction data and video data for a transaction being processed at a Self-Service Terminals (SST) within a transaction area of the SST;
    tracking objects from the video data as a customer, a cart, the SST, at least one item, and zero or more bags;
    identifying at least one intervention required of an attendant for a particular object based on a particular event associated with one or more of the transaction data and the video data; and
    rendering a distinctive visual feature for the particular object or a message for the particular event within An Augmented Reality (AR) interface being viewed and operated by the attendant based on the identifying, wherein the AR interface overlays the distinctive visual feature onto a corresponding object within a live field-of-view video being watched by the attendant, wherein the distinctive visual feature comprises a color or highlight that pinpoints the location of the corresponding object without obstructing other objects within the live field-of-view of the AR interface.

2. The method of claim 1, further comprising, translating gestures or speech provided by the attendant through the AR interface into a verification action or an audit action requested by the attendant responsive to the at least one intervention.

3. The method of claim 2, further comprising, instructing the AR interface to capture an image of the particular object within a field of view of a camera based on a first gesture.

4. The method of claim 3, further comprising, processing an Application Programming Interface (API) to perform facial recognition or item recognition on the image and providing results of the facial recognition or the item recognition to a transaction monitor on behalf of the attendant.

5. The method of claim 3, further comprising processing an Application Programming Interface to perform optical character recognition on a date-of-birth portion of the image and providing a text version of the date-of-birth portion as audit and verification information to a transaction monitor on behalf of the attendant.

6. The method of claim 2, further comprising, processing an Application Programming Interface to interact with a transaction monitor and clear the particular event by the attendant performing the at least one intervention to clear the particular event using a first gesture.

7. The method of claim 2, further comprising, identifying a first gesture as a hand gesture made by the attendant in front of an outward facing camera and provided by the outward facing camera to the AR interface.

8. The method of claim 2, further comprising, identifying a first gesture as an eye gesture or a face gesture made by the attendant to an attendant facing camera and provided by the attendant facing camera to the AR interface.

9. The method of claim 1, wherein collecting further includes identifying the transaction data as transaction details for the transaction, transaction events raised during the transaction, and security events raised during the transaction.

10. The method of claim 9, wherein tracking further includes maintaining a current location of each object with a mapping of a corresponding location of the corresponding object within a live video feed of the transaction area.

11. The method of claim 1, wherein rendering further includes superimposing the distinctive visual feature over the live video feed that is rendered through the AR interface using the mapping in the corresponding location of the particular object.

12. A method, comprising:
receiving object identifiers for objects present within a transaction area of a Self-Service Terminal;
receiving object locations that map the objects into corresponding locations of a live video feed of the transaction area;
receiving a distinctive visual feature for a particular object indicating that an intervention by an attendant is needed for a transaction being processed at the SST; and
rendering the live video feed through an attendant-facing Augmented Reality (AR) interface with the distinctive visual feature presented over the corresponding object location of the particular object within the live video feed, wherein the AR interface overlays the distinctive visual feature onto a corresponding object within a live field-of-view video being watched by the attendant, wherein the distinctive visual feature comprises a color or highlight that pinpoints the location of the corresponding object without obstructing other objects within the live field-of-view of the AR interface.

13. The method of claim 12, further comprising, rendering a text description of the intervention and an SST identifier for the SST within a corner of a screen in the attendant-facing AR interface.

14. The method of claim 12, further comprising, capturing gestures detected from the attendant while the attendant is operating the attendant-facing AR interface.

15. The method of claim 14, further comprising, providing the gestures to an Application Programming Interface (API) to translate the gestures into operations requested by the attendant through the attendant-facing AR interface.

16. The method of claim 15, wherein providing the gestures further includes activating a camera to capture an image from a front-facing camera or a rear-facing camera associated with the attendant-facing AR interface in response to a first translated operation.

17. The method of claim 16, wherein activating further includes providing the image to an Optical Character Recognition (OCR) algorithm, a facial-recognition algorithm, or an item recognition algorithm in response to a second translated operation.

18. The method of claim 17, wherein providing the image further includes instructing a transaction monitor to override or clear the intervention based on a third translated operation.

19. A system, comprising:
a cloud processing environment comprising at least one server;
the at least one server comprising a processor and a non-transitory computer-readable storage medium;
the non-transitory computer-readable storage medium comprises executable instructions; and
the executable instructions when executed on the processor from the non-transitory computer-readable storage medium cause the processor to perform operations comprising:
tracking objects captured in a video feed that are associated with a transaction area of a Self-Service Terminal (SST), the objects comprise a customer, the SST, a cart, items, and zero or more bags;
correlating transaction data obtained from the SST during a transaction of the customer for the items with the tracking;
maintaining a mapping of the objects to current physical locations of the customer, the SST, the cart, the items, and the zero or more bags present within the video feed;
receiving an event associated with an intervention of an attendant with respect to the transaction;
mapping the event to a unique visual feature or unique visual effect;
rendering the live video feed with the unique visual feature or the unique visual effect overlaid on a corresponding object associated with the event within an Augmented-Reality (AR) interface being viewed and operated by the attendant on an AR-enabled device, wherein the AR interface overlays the unique visual feature or the unique visual effect onto a corresponding object within a live field-of-view video being watched by the attendant, wherein the unique visual feature or unique visual effect comprises a color or highlight that pinpoints the location of the corresponding object without obstructing other objects within the live field-of-view of the AR interface.

20. The system of claim 19, wherein the executable instructions further include additional executable instruction that further cause the processor to perform additional operations comprising:
rendering a text description for the intervention and an identifier for the SST within a corner of a screen presented within the AR interface with the live video feed having the overlaid unique visual feature or the overlaid unique visual effect.

* * * * *

UNITED STATES PATENT AND TRADEMARK OFFICE
CERTIFICATE OF CORRECTION

PATENT NO. : 12,175,398 B2  
APPLICATION NO. : 17/513292  
DATED : December 24, 2024  
INVENTOR(S) : Kadry et al.

Page 1 of 1

It is certified that error appears in the above-identified patent and that said Letters Patent is hereby corrected as shown below:

In the Claims

In Column 10, Line 19, in Claim 1, delete "(SST)" and insert --(SSTs)-- therefor In Column 10, Line 28, in Claim 1, delete "An" and insert --an-- therefor Signed and Sealed this  
Eighteenth Day of March, 2025

Coke Morgan Stewart  
*Acting Director of the United States Patent and Trademark Office*